United States Patent
Le et al.

(10) Patent No.: US 11,729,115 B2
(45) Date of Patent: *Aug. 15, 2023

(54) APPARATUS AND METHOD OF CROSSCHECKING DATA COPIES USING ONE OR MORE VOTER ELEMENTS

(71) Applicant: The Boeing Company, Chicago, IL (US)

(72) Inventors: Tu Q. Le, Irvine, CA (US); Sean Ramey, Lake Stevens, WA (US); Christina Joy Yin, Redondo Beach, CA (US); Lawrence Yiuming Ching, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/202,181

(22) Filed: Mar. 15, 2021

(65) Prior Publication Data

US 2021/0297369 A1    Sep. 23, 2021

Related U.S. Application Data

(63) Continuation of application No. 16/262,371, filed on Jan. 30, 2019, now Pat. No. 10,951,544.

(51) Int. Cl.
*H04L 1/00* (2006.01)
*H04L 49/25* (2022.01)
(Continued)

(52) U.S. Cl.
CPC .......... *H04L 49/25* (2013.01); *G06F 11/1004* (2013.01); *H04L 49/555* (2013.01)

(58) Field of Classification Search
CPC ..... H04L 49/25; H04L 49/555; H04L 49/356; G06F 11/1004; H03M 13/09;
(Continued)

(56) References Cited

U.S. PATENT DOCUMENTS

| 7,889,686 B1* | 2/2011 | Chang | ................. H04L 65/1095 |
| | | | 455/445 |
| 2002/0107980 A1* | 8/2002 | Kawaguchi | ............. H04L 45/24 |
| | | | 714/E11.054 |

(Continued)

FOREIGN PATENT DOCUMENTS

EP    2629202 A1    8/2013

OTHER PUBLICATIONS

"First Office Action issued in EP Patent Application No. 20153124.1," dated Jun. 21, 2021, 9 pages.
(Continued)

*Primary Examiner* — Albert Decady
*Assistant Examiner* — Osman M Alshack
(74) *Attorney, Agent, or Firm* — Barta, Jones & Foley, PLLC (57) ABSTRACT

A network switch includes a receive port configured to receive data and two or more parallel first paths each configured to receive a first copy of the data, perform a check on the first copy, and generate a protection for the first copy. One or more first voter elements are configured to receive second copies of the data and to crosscheck the second copies. A processing section is configured to process one or more of the second copies. Two or more parallel second paths are each configured to receive a third copy of the data and perform multiple checks on the third copy including a check based on the protection. One or more second voter elements are configured to receive fourth copies of the data and to crosscheck the fourth copies. A send port is configured to send one or more of the fourth copies to a next network element.

20 Claims, 6 Drawing Sheets

(51) Int. Cl.
*G06F 11/10* (2006.01)
*H04L 49/55* (2022.01)

(58) Field of Classification Search
CPC ............ H03M 13/091; H03M 13/093; H03M 13/095; G11B 2020/1843
USPC .................................. 714/758, 807, 797
See application file for complete search history.

(56) References Cited

U.S. PATENT DOCUMENTS

| | | | |
|---|---|---|---|
| 2006/0242456 A1* | 10/2006 | Kondo | G06F 11/1658 714/6.12 |
| 2007/0024910 A1* | 2/2007 | Katrak | H04L 1/0041 358/1.18 |
| 2007/0047535 A1* | 3/2007 | Varma | H04L 47/12 370/360 |
| 2010/0128726 A1* | 5/2010 | Takakuwa | H04L 49/208 370/390 |
| 2016/0365948 A1* | 12/2016 | Kalle | H04L 1/0045 |
| 2017/0187629 A1* | 6/2017 | Shalev | H04L 43/0823 |
| 2018/0052607 A1* | 2/2018 | Guthrie | G06F 3/0656 |
| 2018/0083737 A1* | 3/2018 | Mendes da Silva | H04L 1/22 |
| 2018/0314597 A1* | 11/2018 | Zhang | G06F 11/1435 |
| 2020/0151067 A1* | 5/2020 | Golov | G06F 11/183 |

OTHER PUBLICATIONS

Land, Ian et al., "Architecting ARING 664, Par 7 (AFDX) Solutions", May 22, 2009, pp. 1-25.

\* cited by examiner

APPARATUS AND METHOD OF CROSSCHECKING DATA COPIES USING ONE OR MORE VOTER ELEMENTS

CROSS-REFERENCE TO RELATED APPLICATION

This application is a continuation application of and claims priority to U.S. patent application Ser. No. 16/262,371, now U.S. Pat. No. 10,951,544, entitled "APPARATUS AND METHOD OF CROSSCHECKING DATA COPIES USING ONE OR MORE VOTER ELEMENTS," filed on Jan. 30, 2019, the disclosure of which is incorporated herein by reference in its entirety.

FIELD OF THE DISCLOSURE

The present disclosure is generally related to crosschecking data copies using one or more voter elements.

BACKGROUND

Networks use switches and other devices to route data (e.g., data packets) between a source device and a destination device. For example, a particular network can include a switch that receives data from the source device, processes the data, and sends the data to the destination device using packet switched routing of the data.

In high-integrity applications, network elements can include mechanisms to detect data corruption. For example, certain switches could include multiple parallel processing paths that perform certain operations in parallel. To illustrate, in one example, a switch might use multiple parallel processing paths that perform the same functions in parallel for particular data received at the switch.

In some cases, use of multiple parallel processing paths could increase hardware cost and operational complexity of the switch. In addition, in some circumstances, data processing by the multiple parallel processing paths could be "mismatched" (where one processing path operates more quickly than another processing path), resulting in a time offset. The time offset may result in differences in the outputs of the parallel processing paths, indicating that data corruption has occurred in the switch.

SUMMARY

In a particular example, a network switch device includes a receive port configured to receive data and two or more parallel first paths coupled to the receive port. Each of the first paths is configured to receive a first copy of the data from the receive port, perform a check on the first copy of the data, and generate a protection for the first copy of the data. The network switch device further includes one or more first voter elements configured to receive second copies of the data from the first paths and to crosscheck the second copies of the data. The network switch device further includes a processing section configured to process one or more of the second copies of the data responsive to the one or more first voter elements. The network switch device further includes two or more parallel second paths that are each configured to receive a third copy of the data from the processing section and perform multiple checks on the third copy of the data. The multiple checks include a check based on the protection. The network switch device further includes one or more second voter elements configured to receive fourth copies of the data from the second paths and to crosscheck the fourth copies of the data. The network switch device further includes a send port configured to send one or more of the fourth copies of the data to a next network element responsive to the one or more second voter elements.

In another particular example, a method of operating a network switch includes receiving data via a receive port and providing first copies of the data to multiple parallel first paths. The method further includes performing, at each of the first paths, a check on a first copy of the data and generating a protection for the first copy of the data. The method further includes crosschecking second copies of the data received from the first paths. The method further includes processing, at a processing section in response to the crosschecking of the second copies of the data indicating that at least some of the second copies match each other and are valid, valid data from at least one of the second copies of the data that match each other and are valid. The method further includes providing third copies of the data to multiple parallel second paths and performing, at each second path of the multiple parallel second paths, multiple checks on a third copy of the data. The multiple checks include a check based on the protection. The method further includes crosschecking fourth copies of the data received from the second paths and selectively sending, in response to crosschecking the fourth copies of the data, one or more of the fourth copies of the data via a send port to a next network element.

In another particular example, a computer-readable medium stores instructions executable by a processor to initiate, perform, or control operations. The operations include receiving data via a receive port and providing first copies of the data to multiple parallel first paths. The operations further include performing, at each of the first paths, a check on a first copy of the data and generating a protection for the first copy of the data. The operations further include crosschecking second copies of the data received from the first paths. The operations further include processing, at a processing section and in response to the crosschecking of the second copies of the data indicating that at least some of the second copies match each other and are valid, valid data from at least one of the second copies of the data that match each other and are valid. The operations further include providing third copies of the data to multiple parallel second paths and performing, at each second path of the multiple parallel second paths, multiple checks on a third copy of the data. The multiple checks include a check based on the protection. The operations further include crosschecking fourth copies of the data received from the second paths and selectively sending, in response to crosschecking the fourth copies of the data, one or more of the fourth copies of the data via a send port to a next network element.

DETAILED DESCRIPTION

In a particular implementation, a network switch device includes a single path (e.g., multiple paths that are "consolidated" into the single path) in an intermediate stage of the network switch device. In one example, the single path includes one or more first voter elements configured to crosscheck data from the multiple parallel first paths (e.g., by verifying integrity of the data). As a result, by crosschecking data "early" (e.g., in an intermediate stage of the network switch device and prior to completing data processing at the network switch device), certain data errors can be detected more quickly (as compared to crosschecking data at a "late" stage). To illustrate, in a particular example, the one or more first voter elements are configured to check for data errors that are "easy" to detect, such as by checking a timestamp of the data, a data size of the data, or timing (e.g., delay) associated with the data.

In some implementations, the single path further includes a processing section (e.g., a switch fabric) that "compresses" certain operations into a single processing section, such as operations that are unlikely to generate errors, operations that are complex to synchronize on multiple parallel processing paths, or operations that are costly to duplicate on multiple parallel processing paths. As a result, data mismatch and time offsets, as well as cost and complexity, associated with duplication of an entire signal path can be reduced or avoided using the single processing section.

Figure 1:
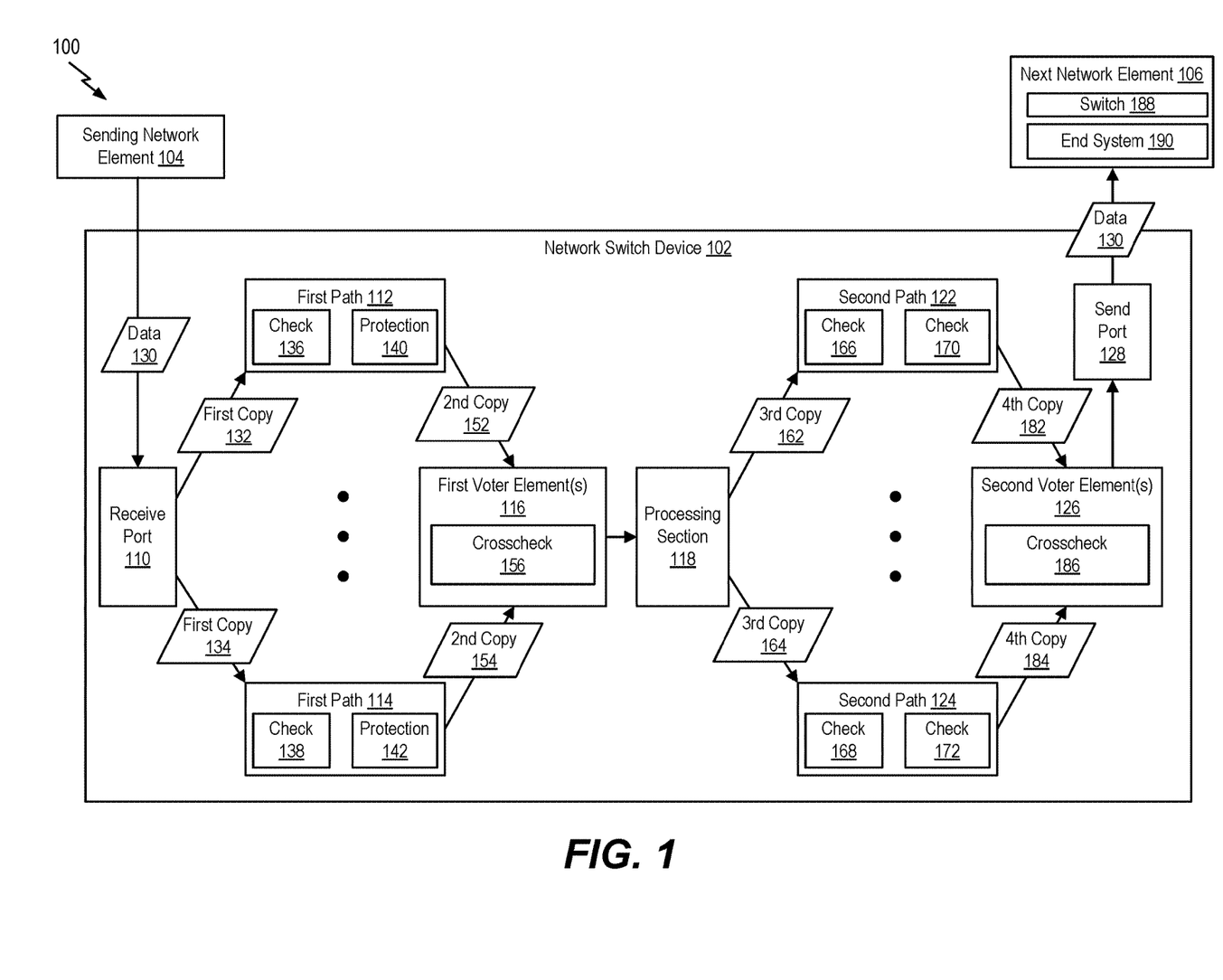
FIG. 1 is a diagram illustrating certain aspects of an example of a system that includes a network switch device configured to crosscheck copies of data using one or more voter elements.

Referring to FIG. 1, a particular illustrative example of a system is depicted and generally designated 100. The system 100 includes a network switch device 102. The system 100 further includes a sending network element 104 and a next network element 106 that are coupled to the network switch device 102.

The network switch device 102 includes a receive port 110 (e.g., a physical receive port). In some examples, the receive port 110 is configured to receive data 130 from the sending network element 104. In some examples, the sending network element 104 includes or corresponds to a switch or an originator system.

The network switch device 102 includes two or more parallel first paths (e.g., a first path 112 and a first path 114) that are coupled to the receive port 110. In some examples, the first paths 112, 114 are duplicate paths. For example, in some implementations, the first path 112 is synchronized with the first path 114 and is configured to generate an output that matches an output of the first path 114 if no errors occur in the first paths 112, 114.

The network switch device 102 further includes one or more first voter elements 116. In the example of FIG. 1, the one or more first voter elements 116 are coupled to the first paths 112, 114. The network switch device 102 further includes a processing section 118 (e.g., a switch fabric) and two or more parallel second paths (e.g., a second path 122 and a second path 124) coupled to the processing section 118. In some examples, the processing section 118 includes one processing path. In this example, the processing section 118 includes a single path processing section. In some examples, the processing section 118 is configured to route a particular copy of the data 130 provided by the one or more first voter elements 116 to the second paths 122, 124 and to store the particular copy of the data 130.

In some examples, the second paths 122, 124 are duplicate paths. For example, in some implementations, the second path 122 is synchronized with the second path 124 and is configured to generate an output that matches an output of the second path 124 if no errors occur in the second paths 122, 124.

The network switch device 102 further includes one or more second voter elements 126 and a send port 128 (e.g., a physical transmit port). In the example of FIG. 1, the send port 128 is coupled to the one or more second voter elements 126. In some examples, the send port 128 is configured to forward the data 130 to the next network element 106. In some examples, the next network element 106 includes one or more of a switch 188 or an end system 190.

During operation, the receive port 110 receives data from one or more network elements. To illustrate, in the example of FIG. 1, the receive port 110 is configured to receive data 130 from the sending network element 104.

The first path 112 is configured to receive a first copy 132 of the data 130, and the first path 114 is configured to receive a first copy 134 of the data 130. The first path 112 is configured to perform a check 136 of the first copy 132 of the data 130, and the first path 114 is configured to perform a check 138 of the first copy 134 of the data 130. The first path 112 is configured to generate protection 140 for the first copy 132, and the first path 114 is configured to generate protection 142 for the first copy 134. In a particular example, the first path 112 is configured to add the protection 140 to the first copy 132 to generate a second copy 152 of the data 130, and the first path 114 is configured to add the protection 142 to the first copy 134 to generate a second copy 154 of the data 130.

The one or more first voter elements 116 are configured to receive the second copy 152 of the data 130 from the first path 112 and to receive the second copy 154 of the data 130 from the first path 114. The one or more first voter elements 116 are configured to perform a crosscheck 156 of the second copies 152, 154 of the data. In some implementations, the second copy 152 includes the protection 140, and the second copy 154 includes the protection 142. In some implementations, performing the crosscheck 156 includes checking a timestamp included in each of the second copies 152, 154, checking a data size of each of the second copies 152, 154, checking timing (e.g., delay) associated with each of the second copies 152, 154, checking one or more other parameters, or a combination thereof.

In some implementations, the one or more first voter elements 116 are configured to determine a pass status or a fail status associated with the crosscheck 156 based on whether the second copies 152, 154 match one another and are valid. In a particular example, the second copies 152, 154 are valid if the checks 136, 138 are satisfied, and the second copies 152, 154 match one another if the second copy 152 is the same as the second copy 154.

To further illustrate, in some implementations, the one or more first voter elements 116 determine a pass status of the crosscheck 156 if the second copies 152, 154 are valid and match one another. In this case, in some examples, the one or more first voter elements 116 provide to the processing section 118 valid data corresponding to the second copies 152, 154 in response to determining the pass status. As another example, in some implementations, the one or more first voter elements 116 determine a fail status of the crosscheck 156 if the second copies 152, 154 differ from one another, if the second copies 152, 154 are invalid, or both (e.g., based on differing timestamps, differing data sizes or content, differing delays, one or more other parameters, or a combination thereof). In this case, in some implementations, the one or more first voter elements 116 are configured to "drop" the data 130 in response to determining the fail status. As a particular illustrative example, in some implementations, the network switch device 102 is configured to provide an exception or an error message (e.g., a negative-acknowledgement (NACK) message) to the sending network element 104. In some examples, the sending network element 104 is configured to resend the data 130 in response to receiving the exception or error message.

In some implementations, the one or more first voter elements 116 are configured to perform a majority vote based on three or more second copies of the data 130. For example, in some implementations, the network switch device 102 includes N first paths that are coupled to the receive port 110 and the one or more first voter elements 116 and that are configured to generate N second copies of the data 130 (where N is a positive integer greater than two). In this case, in some implementations, the one or more first voter elements 116 are configured to select a particular copy of the N second copies as valid data to be forwarded to the processing section 118 based on receiving more than N/2 valid instances of the particular copy from the N first paths.

The processing section 118 is configured to process one or more of the second copies 152, 154 of the data 130 responsive to the one or more first voter elements 116. In a particular example, the processing section 118 includes a switch fabric configured to receive multiple input packets of the data 130 (e.g., from the receive port 110, from other sources not shown in FIG. 1, or a combination thereof) and to route output packets to output queues (e.g., output queues included in the send port 128, other components not shown in FIG. 1, or a combination thereof). In some examples, the processing section 118 is configured to read routing or destination information of the data 130 (e.g., from packet headers included in the data 130) to determine the output queues.

The second path 122 is configured to receive a third copy 162 of the data 130 from the processing section 118 and to perform multiple checks 166, 170 on the third copy 162 of the data 130. The multiple checks 166, 170 include a check based on protection, such as the protection 140 or the protection 142. The second path 124 is configured to receive a third copy 164 of the data 130 from the processing section 118 and to perform multiple checks 168, 172 on the third copy 164 of the data 130. The checks 166, 172 include a check based on the protection, such as the protection 140 or the protection 142 (e.g., an error check).

The one or more second voter elements 126 are configured to receive a fourth copy 182 of the data 130 from the second path 122 and to receive a fourth copy 184 of the data 130 from the second path 124. The one or more second voter elements 126 are configured to perform a crosscheck 186 of the fourth copies 182, 184 of the data 130. In some implementations, performing the crosscheck 186 includes checking a timestamp included in each of the fourth copies 182, 184, checking a route associated with each of the fourth copies 182, 184, checking timing (e.g., delay) associated with each of the fourth copies 182, 184, checking one or more other parameters, or a combination thereof.

In some implementations, the one or more second voter elements 126 are configured to determine a pass status or a fail status associated with the crosscheck 186 based on whether the fourth copies 182, 184 match one another and are valid. In a particular example, the fourth copies 182, 184 are valid if the checks 166, 168, 170, and 172 are satisfied, and the fourth copies 182, 184 match one another if the fourth copy 182 is the same as the fourth copy 184.

To further illustrate, in some implementations, the one or more second voter elements 126 determine a pass status of the crosscheck 186 if the fourth copies 182, 184 match one another and are valid. In this case, in some examples, the one or more second voter elements 126 provide to the send port 128 valid data corresponding to the fourth copies 182, 184 in response to determining the pass status. As another example, in some implementations, the one or more second voter elements 126 determine a fail status of the crosscheck 186 if the fourth copies 182, 184 differ from one another, if the fourth copies 182, 184 are invalid, or both. In this case, in some implementations, the one or more second voter elements 126 are configured to "drop" the data 130 in response to determining the fail status. As a particular illustrative example, in some implementations, the network switch device 102 is configured to provide an exception or an error message (e.g., a NACK message) to the sending network element 104. In some examples, the sending network element 104 is configured to resend the data 130 in response to receiving the exception or error message.

In some implementations, the one or more second voter elements 126 are configured to perform a majority vote based on three or more fourth copies of the data 130. For example, in some implementations, the network switch device 102 includes M second paths that are coupled to the processing section 118 and the one or more second voter elements 126 and that are configured to generate M fourth copies of the data 130 (where M is a positive integer greater than two). In this case, in some implementations, the one or more second voter elements 126 are configured to select a particular copy of the M fourth copies as valid data to be forwarded to the send port 128 based on receiving more than M/2 valid instances of the particular copy from the M second paths.

The send port 128 is configured to send one or more of the fourth copies 182, 184 of the data 130 to the next network element 106 responsive to the one or more second voter elements 126. For example, in some implementations, the send port 128 includes a physical interface that is coupled to the one or more second voter elements 126 and to the next network element 106.

Although the example of FIG. 1 illustrates two first paths 112, 114, in other examples, the receive port 110 can be coupled to three or more first paths. Alternatively or in addition, although the example of FIG. 1 illustrates two second paths 122, 124, in other examples, processing section 118 can be coupled to three or more second paths. To further illustrate, in some examples, the network switch device 102 includes different numbers of first paths and second paths. For example, in a particular implementation, the network switch device 102 includes N first paths and M second paths, where N≥2, where M≥2, and where N≠M. In addition, although certain aspects of the voter elements 116, 126 are described with reference to a majority vote, in other implementations another technique can be used, such as a supermajority vote. In some examples, the network switch device 102 includes multiple receive ports 110 (e.g., where each of the multiple receive ports 110 is coupled to a corresponding path of a set of parallel paths that "converge" to the processing section 118). Alternatively or in addition, in some implementations, the network switch device 102 includes multiple send ports 128 (e.g., where each of the multiple send ports 128 is coupled to a corresponding path of a set of parallel paths that "branch off" from the processing section 118).

In addition, although the example of FIG. 1 illustrates two sets of parallel paths (the first paths 112, 114 and the second paths 122, 124), in other implementations, the network switch device 102 can include a different number of sets of parallel paths, such as one set of parallel paths, three sets of parallel paths, or another number of sets of parallel paths. As a particular illustrative example, the network switch device 102 can include three sets of parallel paths and two sets of processing sections.

Further, it is noted that in some implementations, multiple parallel paths can be "consolidated" to a reduced number of parallel paths (e.g., instead of to a single processing section 118). To illustrate, in some examples, three parallel first paths can be "consolidated" to two parallel paths (e.g., instead of to a single processing section 118). Alternatively or in addition, the two parallel paths can be "expanded" to three parallel second paths. In some implementations, consolidating a particular number of parallel paths to a reduced number of parallel paths (instead of a single processing section) reduces device size or complexity (as compared to use of greater parallelism) while also enabling data integrity or redundancy in the reduced parallel paths as compared to use of a single processing section (e.g., by performing data matching and validation at an output of the reduced parallel paths).

One or more aspects of FIG. 1 improve operation of a network switch device. For example, by performing the crosscheck 156 "early" (e.g., in an intermediate stage of the network switch device 102 and prior to completing data processing at the network switch device 102), certain data errors can be detected more quickly (as compared to crosschecking data at a "late" stage). To illustrate, in a particular example, the one or more first voter elements 116 are configured to check for data errors that are "easy" to detect, such as by checking a timestamp of the second copies 152, 154, a data size of the second copies 152, 154, or timing (e.g., delay) associated with the second copies 152, 154, as illustrative examples. As a result, certain data errors can be detected more quickly (as compared to crosschecking data at a "late" stage), increasing data throughput of the system 100.

Further, in some examples, reduced parallelism at the processing section 118 (as compared to the first paths 112, 114 and the second paths 122, 124) results in lower complexity and cost (as compared to including aspects of the processing section 118 in the first path 112 and the first path 114). In some implementations, the protection 140 and the protection 142 enable detection of errors that occur during processing by the processing section 118 (since the reduced redundancy at the processing section 118 reduces protection provided by parallelism).

Figure 2:
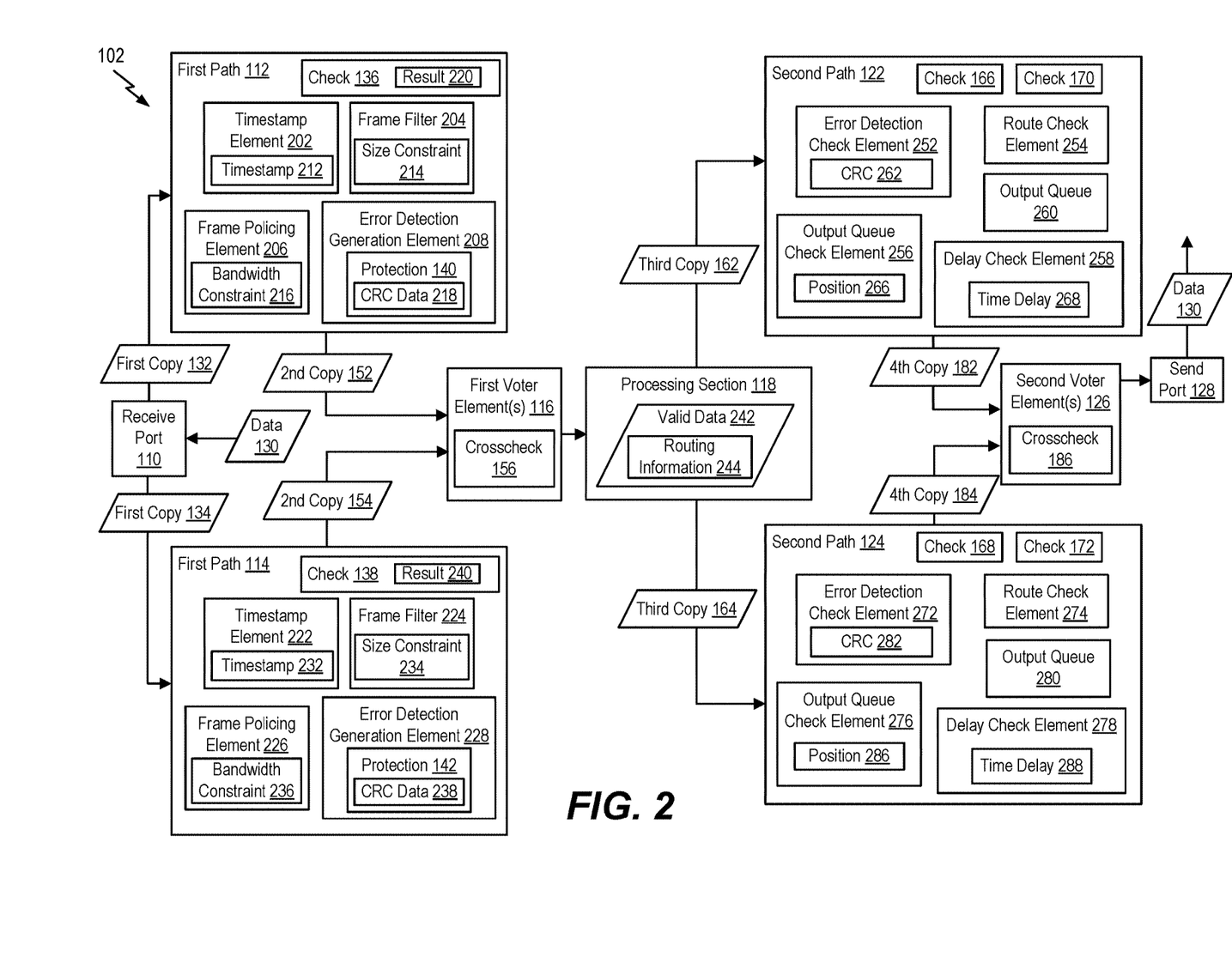
FIG. 2 is a diagram illustrating aspects of a particular example of a network switch device, such as the network switch device of FIG. 1.

FIG. 2 depicts particular aspects of an illustrative example of the network switch device 102. In the example of FIG. 2, the first path 112 includes a timestamp element 202 configured to apply a timestamp 212 to the first copy 132 of the data 130. In FIG. 2, the first path 112 further includes a frame filter 204 configured to apply a size constraint 214 to the first copy 132 of the data 130. The example of FIG. 2 also depicts that the first path 112 includes a frame policing element 206 configured to apply a bandwidth constraint 216 to the first copy 132 of the data 130 and an error detection generation element 208 configured to generate the protection 140. In a particular example, the protection 140 includes cyclic redundancy check (CRC) data 218 based on the first copy 132 of the data 130 and the timestamp 212 to verify integrity after processing at the processing section 118. In some examples, the check 136 is performed by the frame filter 204 (e.g., by checking that the first copy 132 satisfies the size constraint 214), by the frame policing element 206 (e.g., by checking that the first copy 132 satisfies the bandwidth constraint 216), or both.

In the example of FIG. 2, the first path 114 includes a timestamp element 222 configured to apply a timestamp 232 to the first copy 134 of the data 130. In FIG. 2, the first path 114 further includes a frame filter 224 configured to apply a size constraint 234 to the first copy 134 of the data 130. The example of FIG. 2 also depicts that the first path 114 includes a frame policing element 226 configured to apply a bandwidth constraint 236 to the first copy 134 of the data 130 and an error detection generation element 228 configured to generate the protection 142. In a particular example, the protection 142 includes cyclic redundancy check (CRC) data 238 based on the first copy 134 of the data 130 and the timestamp 232 to verify integrity after processing at the processing section 118. In some examples, performing the check 138 includes checking that the first copy 134 satisfies the size constraint 234 by the frame filter 224, checking that the first copy 134 satisfies the bandwidth constraint 236 by the frame policing element 226, or both.

In some examples, the one or more first voter elements 116 are configured to validate one or more of the second copies 152, 154 of the data 130 by comparing results 220, 240 of the checks 136, 138, by comparing the second copies 152, 154 of the data 130 of each of the first paths 112, 114, by comparing the timestamps 212, 232 of each of the first paths 112, 114, by comparing the protections 140, 142 generated by each of the first paths 112, 114, or any combination thereof. As a particular example, in some implementations, the one or more first voter elements 116 are configured to validate the second copies 152, 154 based on determining that the second copy 152 matches the second copy 154 and further based on determining that the second copies 152, 154 satisfy the size constraints 214, 234, that second copies 152, 154 satisfy the bandwidth constraints 216, 236, or a combination thereof. In some implementations, the one or more first voter elements 116 are configured to send at least one of the second copies 152, 154 that are determined to match each other and to be valid (e.g., using the crosscheck 156) to the processing section as valid data 242.

In a particular example, the processing section 118 is configured to embed routing information 244 with the valid data 242 and to store the valid data 242 with the embedded routing information 244 (e.g., at an output queue associated with the send port 128). In some examples, the valid data 242 corresponds to the third copies 162, 164 of the data 130.

In the example of FIG. 2, the second path 122 includes an error detection check element 252 configured to perform a cyclic redundancy check (CRC) 262 using the protection 140 or the protection 142 to verify data integrity and timestamp integrity of the third copy 162 of the data 130 after processing and storage at the processing section 118. FIG. 2 also depicts that the second path 122 includes a route check element 254 configured to check the routing information 244 associated with the third copy 162 of the data 130. In FIG. 2, the second path 122 includes an output queue check element 256 configured to check a position 266 of the third copy 162 of the data 130 in an output queue (e.g., an output queue 260 of the second path 122). The example of FIG. 2 also depicts that the second path 122 includes a delay check element 258 configured to check a time delay 268 based on a timestamp (e.g., the timestamp 212, the timestamp 232, or another timestamp) associated with the third copy 162 of the data 130. In some examples, the checks 166, 170 are performed by the error detection check element 252 (e.g., based on the CRC 262), by the route check element 254, by the output queue check element 256 (e.g., based on the position 266), by the delay check element 258 (e.g., based on the time delay 268), or a combination thereof. As a particular illustrative example, in some implementations, the check 166 is performed by the error detection check element 252 (e.g., based on the CRC 262), and the check 170 is performed by the delay check element 258 (e.g., based on the time delay 268).

In the example of FIG. 2, the second path 124 includes an error detection check element 272 configured to perform a cyclic redundancy check (CRC) 282 using the protection 140 to verify data integrity and timestamp integrity of the third copy 164 of the data 130 after processing and storage at the processing section 118. FIG. 2 also depicts that the second path 124 includes a route check element 274 configured to check the routing information 244 associated with the third copy 164 of the data 130. In FIG. 2, the second path 124 includes an output queue check element 276 configured to check a position 286 of the third copy 164 of the data 130 in an output queue (e.g., an output queue 280 of the second path 124). The example of FIG. 2 also depicts that the second path 124 includes a delay check element 278 configured to check a time delay 288 based on a timestamp (e.g., the timestamp 212, the timestamp 232, or another timestamp) associated with the third copy 164 of the data 130. In some examples, the checks 168, 172 are performed by the error detection check element 272 (e.g., based on the CRC 282), by the route check element 274, by the output queue check element 276 (e.g., based on the position 286), by the delay check element 278 (e.g., based on the time delay 288), or a combination thereof. As a particular illustrative example, in some implementations, the check 168 is performed by the error detection check element 272 (e.g., based on the CRC 282), and the check 172 is performed by the delay check element 278 (e.g., based on the time delay 288).

In some examples, the one or more second voter elements 126 are further configured to validate one or more of the fourth copies 182, 184 of the data 130 at least partially based on the cyclic redundancy checks 262, 282, the positions 266, 286, the time delays 268, 288, and whether at least a majority of the fourth copies 182, 184 of the data 130 match each other (e.g., using the crosscheck 186).

One or more aspects of FIG. 2 improve operation of a network switch device. For example, by performing the crosscheck 156 "early" (e.g., in an intermediate stage of the network switch device 102 and prior to completing data processing at the network switch device 102), certain data errors can be detected more quickly (as compared to crosschecking data at a "late" stage). To illustrate, in a particular example, the one or more first voter elements 116 are configured to check for data errors that are "easy" to detect, such as by checking the timestamps 212, 232, by checking that the second copies 152, 154 comply with the size constraints 214, 234, by checking that the second copies 152, 154 comply with the bandwidth constraints 216, 236, or by checking the protection 140, 142, as illustrative examples. As a result, certain data errors can be detected more quickly (as compared to crosschecking data at a "late" stage), increasing data throughput of the system 100.

Further, in some examples, reduced parallelism at the processing section 118 (as compared to the first paths 112, 114 and the second paths 122, 124) results in lower complexity and cost (as compared to including aspects of the processing section 118 in the first path 112 and the first path 114). In some implementations, the protection 140 and the protection 142 enable detection of errors that occur during processing by the processing section 118 (since the reduced redundancy at the processing section 118 reduces protection provided by parallelism).

Figure 3:
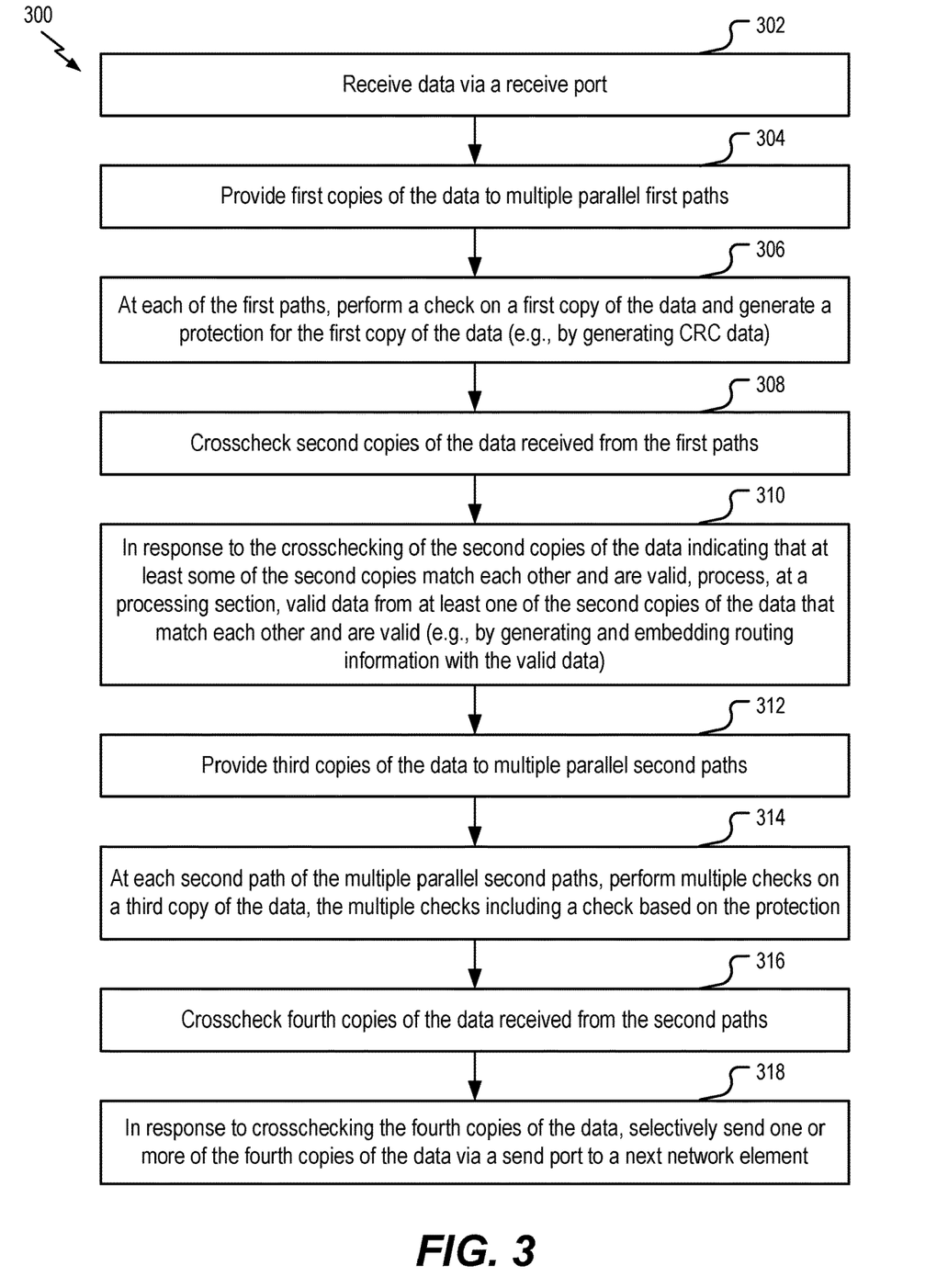
FIG. 3 is a diagram of an example of a method of operation of a network switch, such as the network switch device of FIG. 1.

Referring to FIG. 3, a particular example of a method of operating a network switch is depicted and generally designated 300. In some implementations, the method 300 is performed to operate the network switch device 102.

The method 300 includes receiving data via a receive port, at 302. In a particular example, the data is received at the receive port from a sending network element. To illustrate, in some examples, the network switch device 102 is configured to receive the data 130 using the receive port 110.

The method 300 further includes providing first copies of the data to multiple parallel first paths, at 304. In a particular example, the receive port 110 is configured to provide the first copies 132, 134 of the data 130 to the first paths 112, 114.

The method 300 further includes, at each of the first paths, performing a check on a first copy of the data and generating a protection for the first copy of the data, at 306. In a particular example, performing the check includes performing the check 136 by the first path 112 and further includes performing the check 138 by the first path 114. In a particular example, generating the protection includes generating the protection 140 by the first path 112 and further includes generating the protection 142 by the first path 114. In a particular example, generating the protection includes generating the CRC data 218, the CRC data 238, or both. Alternatively or in addition, in some examples, performing the check includes performing one or more operations described with reference to FIG. 2.

The method 300 further includes crosschecking second copies of the data received from the first paths, at 308. In a particular example, crosschecking the second copies includes performing the crosscheck 156 by the one or more first voter elements 116.

The method 300 further includes, in response to the crosschecking of the second copies of the data indicating that at least some of the second copies match each other and are valid, processing, at a processing section, valid data from at least one of the second copies of the data that match each other and are valid, at 310. In a particular example, the processing section 118 is configured to process at least one of the second copies 152, 154 as the valid data 242. In some examples, processing the valid data includes generating and embedding routing information (e.g., the routing information 244) with the valid data. In some examples, processing the valid data is performed at a single processing section of the network switch (e.g., where the processing section 118 corresponds to a single processing section of the network switch device 102).

The method 300 further includes providing third copies of the data to multiple parallel second paths, at 312. In a particular example, the processing section 118 is configured to provide the third copies 162, 164 to the second paths 122, 124.

The method 300 further includes performing, at each second path of the multiple parallel second paths, multiple checks on a third copy of the data, the multiple checks including a check based on the protection, at 314. In a particular example, performing the multiple checks includes performing any of the checks 166, 168, 170, and 172 including a check (e.g., a CRC check or another error detection check) based on the protection 140 or the protection 142. Alternatively or in addition, in some examples, performing the multiple checks includes performing one or more operations described with reference to FIG. 2.

The method 300 further includes crosschecking fourth copies of the data received from the second paths, at 316. In a particular example, crosschecking the fourth copies of the data includes performing the crosscheck 186 by the one or more second voter elements 126.

The method 300 further includes selectively sending, in response to crosschecking the fourth copies of the data, one or more of the fourth copies of the data via a send port to a next network element, at 318. In a particular example, the data 130 is sent by the send port 128 to the next network element 106.

One or more aspects of the method 300 of FIG. 3 improve operation of a network switch device. For example, by performing a crosscheck "early" (e.g., in an intermediate stage of the network switch device 102 and prior to completing data processing at the network switch device 102), certain data errors can be detected more quickly (as compared to crosschecking data at a "late" stage). As a result, certain data errors can be detected more quickly (as compared to crosschecking data at a "late" stage), increasing data throughput of a system.

Further, in some examples, reduced parallelism at a single processing section (e.g., the processing section 118) results in lower complexity and cost (as compared to implementing the processing section using parallel processing paths). In some implementations, error detection information (e.g., the protection 140 and the protection 142) is used to detect errors that occur during processing by the processing section (since the reduced redundancy at the processing section reduces protection provided by parallelism).

Figure 4:
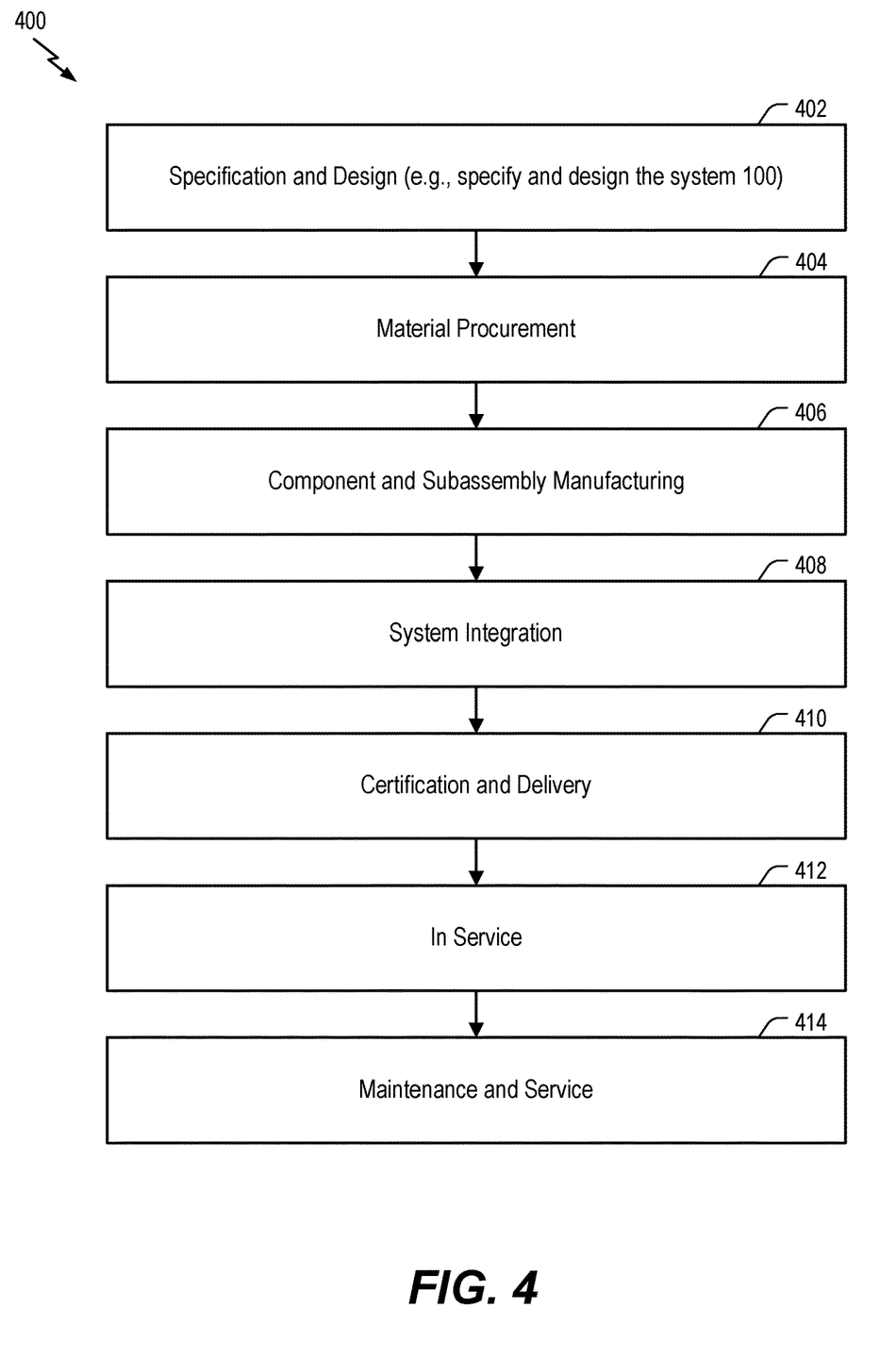
FIG. 4 is a flow chart of an example of a life cycle of a vehicle including the system of FIG. 1.

Referring to FIG. 4, a flowchart of an illustrative example of a life cycle of a vehicle (e.g., an aircraft) including the system 100 is depicted and generally designated 400. During pre-production, the method 400 includes specification and design of the vehicle, at 402. In a particular example, specification and design of the vehicle includes determining one or more characteristics of the system 100. During the specification and design of the vehicle, the method 400 includes specifying components, such as one or more components of the system 100. In some examples, specification and design of the system 100 is performed at least in part on a communication protocol, such as an Ethernet-based communication protocol, an aircraft data network (ADN) communication protocol, one or more other communication protocols, or a combination thereof.

At 404, the method 400 includes material procurement. For example, the method 400 can include procuring materials for the vehicle (such as by procuring materials for one or more components of the system 100).

During production, the method 400 includes, at 406, component and subassembly manufacturing and, at 408, system integration of the vehicle. In some implementations, system integration of the method 400 includes integrating the system 100 within a vehicle, such as by integrating the system 100 within a communication system of the vehicle or within a control system of the vehicle, as illustrative examples.

The method 400 includes certification and delivery of the vehicle, at 410, and placing the vehicle in service, at 412. In some implementations, certifying the vehicle includes testing operation of the system 100.

While in service, the vehicle may be scheduled for routine maintenance and service (which may also include modification, reconfiguration, refurbishment, and so on). At 414, the method 400 includes performing maintenance and service on the vehicle. To illustrate, in some examples, performing maintenance and service may include inspecting and servicing components of the system 100.

Figure 5:
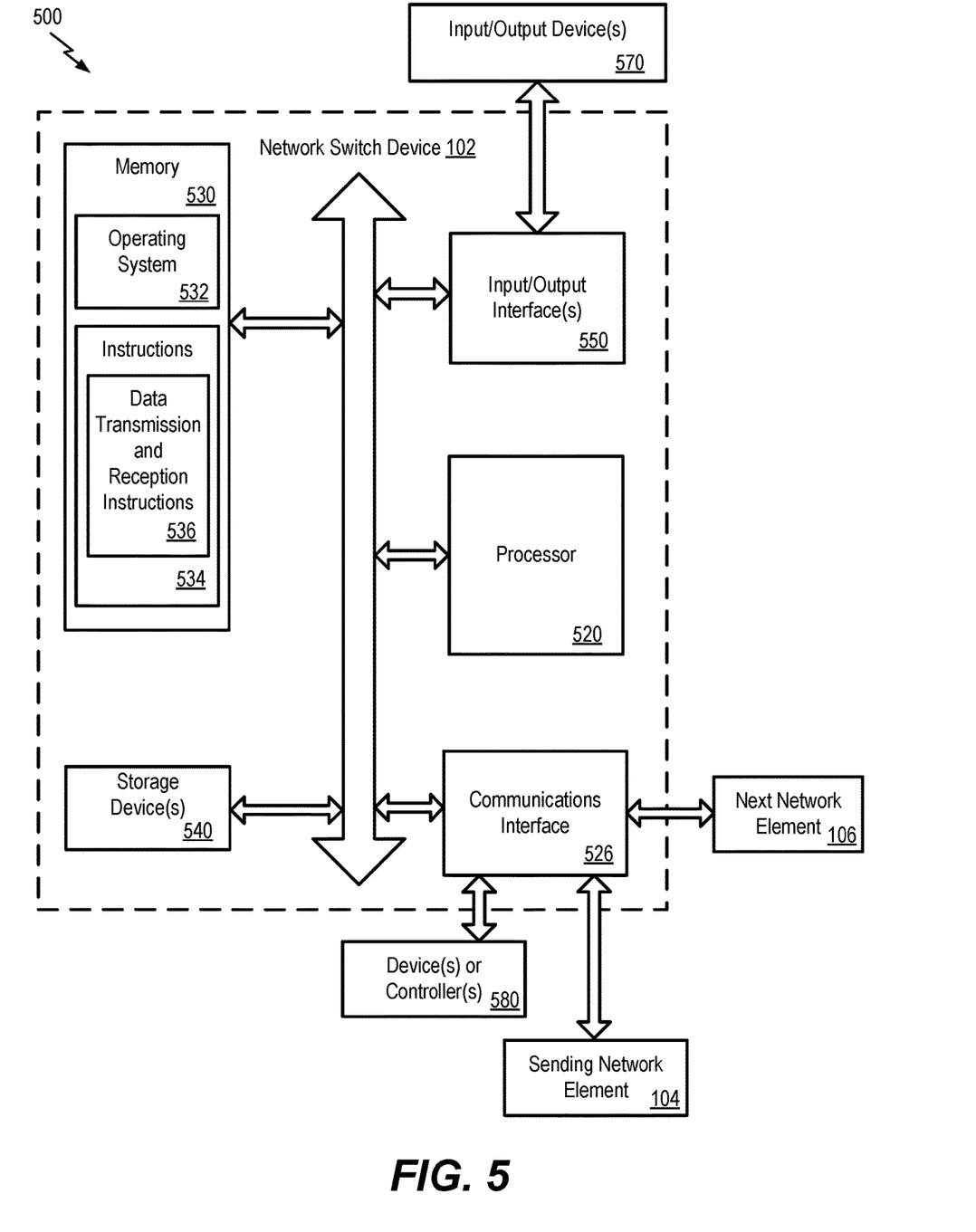
FIG. 5 is a block diagram illustrating aspects of an example of a computing system that is configured to execute instructions to initiate, perform, or control operations of the method of FIG. 3.

FIG. 5 is an illustration of a block diagram of a computing environment 500 including a particular example of the network switch device 102. In the example of FIG. 5, the network switch device 102 is configured to support embodiments of computer-implemented methods and computer-executable program instructions (or code) according to the present disclosure. In some examples, the network switch device 102, or portions thereof, executes instructions to initiate, perform, or control operations described herein, such as operations of the method 300 of FIG. 3.

The network switch device 102 includes a processor 520. The processor 520 is configured to communicate with a memory 530 (e.g., a system memory or another memory), one or more storage devices 540, one or more input/output interfaces 550, a communications interface 526, or a combination thereof.

Depending on the particular implementation, the memory 530 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 5, the memory 530 stores an operating system 532, which can include a basic input/output system for booting the network switch device 102 as well as a full operating system to enable the network switch device 102 to interact with users, other programs, and other devices. The particular example of FIG. 5 also depicts that the memory 530 stores instructions 534 executable by the processor 520. In some examples, the instructions 534 are executable by the processor 520 to transmit signals between components of the network switch device 102, such as the memory 530, the one or more storage devices 540, the one or more input/output interfaces 550, the communications interface 526, or a combination thereof.

In a particular example, the instructions 534 include data transmission and reception instructions 536. In some examples, the data transmission and reception instructions 536 are executable by the processor 520 to initiate, control, or perform one or more operations of the method 300 of FIG. 3. As a particular example, in some implementations, the processor 520 is configured to execute the data transmission and reception instructions 536 to initiate transmission of the data 130 to the next network element 106. Alternatively or in addition, in some examples, the processor 520 is configured to execute the data transmission and reception instructions 536 to control reception of the data 130 (or other data) from the sending network element 104. Alternatively or in addition, in some implementations, one or more of the sending network element 104 or the next network element 106 includes a processor (e.g., the processor 520 or another processor), a memory (e.g., the memory 530 or another memory), or a combination thereof.

To further illustrate, in a particular example, the processor 520 is configured to execute the data transmission and reception instructions 536 to perform one or more operations described herein, such as one or more operations described with reference to the receive port 110, the first paths 112, 114, the one or more first voter elements 116, the processing section 118, the second paths 122, 124, the one or more second voter elements 126, the send port 128, or a combination thereof. As a particular example, in some implementations, the network switch device 102 includes a processor configured to execute the data transmission and reception instructions 536 to perform any of the checks 136, 138, the crosscheck 156, the checks 166, 168, 180, and 172, or the crosscheck 186 (e.g., by executing one or more compare instructions to compare copies of the data 130). In this example, any of the voter elements 116, 126 can correspond to instructions (e.g., firmware or other instructions) executable by a processor to determine whether data copies match each other and are valid.

Alternatively or in addition, in some examples, one or more operations described herein are performed using one or more hardware components or circuits, such as by using a comparator circuit to perform any of the checks 136, 138, the crosscheck 156, the checks 166, 168, 180, and 172, or the crosscheck 186 (e.g., by using the comparator circuit to compare copies of the data 130), as illustrative examples. In this case, any of the voter elements 116, 126 can include one or more hardware circuits (e.g., one or more comparator circuits, as an illustrative example) configured to determine whether data copies match each other and are valid.

In some implementations, the one or more storage devices 540 include nonvolatile storage devices, such as magnetic disks, optical disks, or flash memory devices. In some examples, the one or more storage devices 540 include removable memory devices, non-removable memory devices or both. In some cases, the one or more storage devices 540 are configured to store an operating system, images of operating systems, applications, and program data. In a particular example, the memory 530, the one or more storage devices 540, or both, include tangible computer-readable media.

In the example of FIG. 5, the processor 520 is configured to communicate with the one or more input/output interfaces 550 to enable the network switch device 102 to communicate with one or more input/output devices 570 to facilitate user interaction. In some implementations, the one or more input/output interfaces 550 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 570 include keyboards, pointing devices, displays, speakers, microphones, touch screens, one or more other devices, or a combination thereof. In some examples, the processor 520 is configured to detect interaction events based on user input received via the one or more input/output interfaces 550.

In a particular example, the processor 520 is configured to communicate with (or send signals to) one or more devices 580 using the communications interface 526. In some implementations, the communications interface 526 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 580 include host computers, servers, workstations, one or more other computing devices, or a combination thereof.

In some examples, the processor 520 is configured to send or receive data (e.g., the data 130 or other data) using the system 100. For example, in some implementations, the system 100 is coupled to the processor 520 via the communications interface 526. In some implementations, the processor 520 is configured to initiate, perform, or control operations of the method 300 of FIG. 3.

Figure 6:
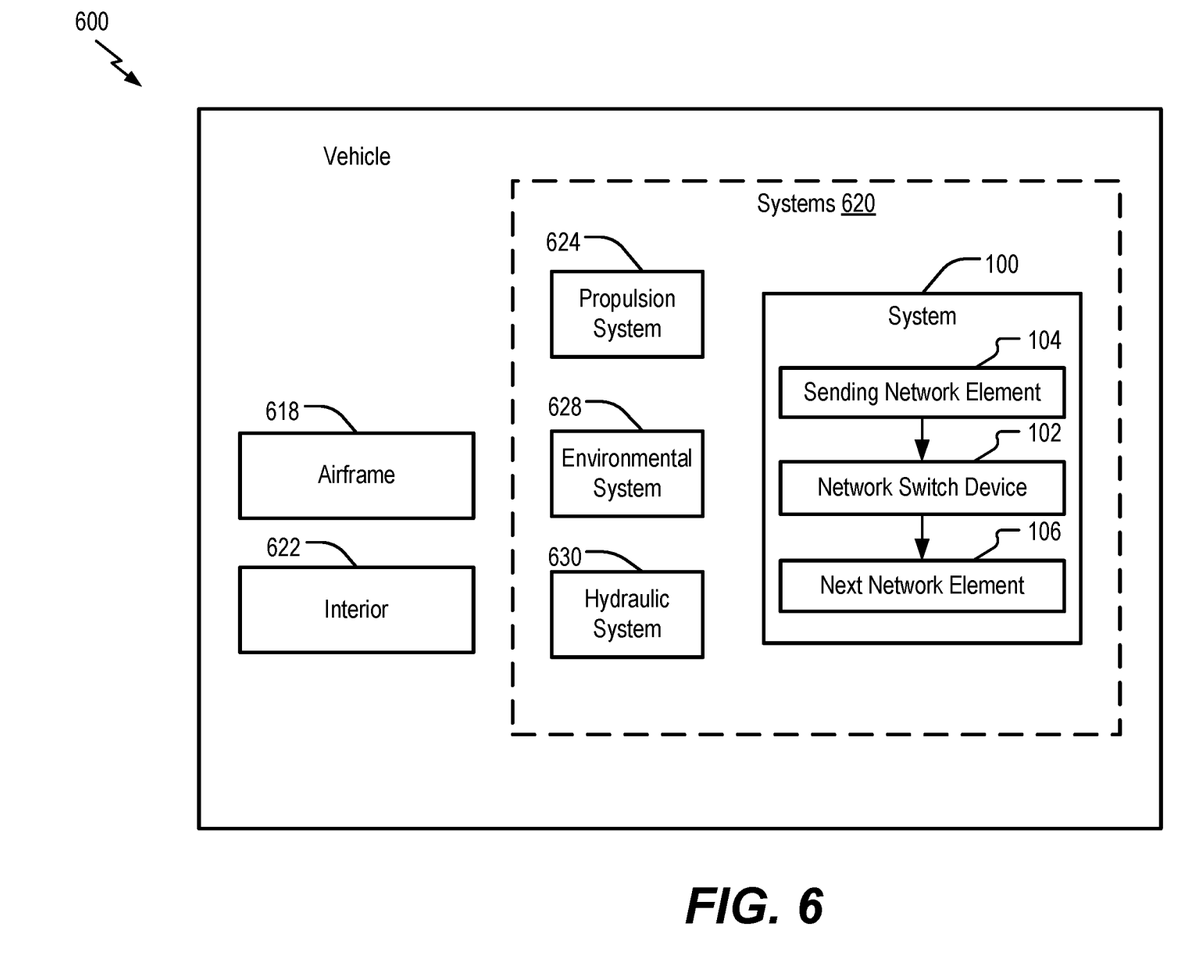
FIG. 6 is a block diagram illustrating aspects of an illustrative implementation of a vehicle that includes the system of FIG. 1.

Aspects of the disclosure may be described in the context of an example of a vehicle 600 as shown in FIG. 6. In some examples, the vehicle 600 includes or corresponds to an aircraft.

As shown in FIG. 6, the vehicle 600 includes an airframe 618 with a plurality of systems 620 and an interior 622. Examples of the plurality of systems 620 include one or more of a propulsion system 624, an environmental system 628, a hydraulic system 630, and the system 100. Any number of other systems may be included.

In some implementations, the system 100 is included in a particular system of the systems 620, such as a communications system or a control system of the vehicle 600, as illustrative examples. In some examples, the system 100 is included in an Ethernet network (e.g., in an Ethernet-based communications system of the vehicle 600), in an aircraft data network (ADN) system of the vehicle 600, in one or more other systems of the vehicle 600, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A network switch device comprising:
a receive port configured to receive data;
two or more parallel paths coupled to the receive port, each of the two or more parallel paths configured to receive a first copy of the data from the receive port, and perform a check on the first copy of the data;

a frame filter configured to apply a size constraint to the two or more parallel paths;
a frame policing element configured to apply a bandwidth constraint to the two or more parallel paths;
one or more voter elements configured to:
receive second copies of the data from the two or more parallel paths;
crosscheck the second copies of the data;
validate one or more of the second copies of the data by the following: comparing timestamps of the second copies of the data from the two or more parallel paths and that the second copies satisfy the size constraint and the bandwidth constraint; and
a send port configured to:
receive at least one copy of the second copies that is determined to be valid; and
send the at least one copy to a next network element responsive to the one or more voter elements.

2. The network switch device of claim 1, wherein each of the two or more parallel paths comprises:
a timestamp element configured to apply a timestamp to the first copy of the data; and
an error detection generation element configured to generate a protection, wherein the protection comprises cyclic redundancy check (CRC) data based on the first copy of the data and the timestamp to verify integrity during the validating.

3. The network switch device of claim 1, further comprising a processing section configured to embed routing information with valid data and to store the valid data with the embedded routing information.

4. The network switch device of claim 3, wherein the processing section comprises a switch fabric.

5. The network switch device of claim 3, wherein the processing section is further configured to route the data and to store the data.

6. The network switch device of claim 1, wherein the two or more parallel paths are configured to generate a protection for the first copy of the data.

7. The network switch device of claim 6, further comprising:
a timestamp element configured to apply a timestamp to the first second copy of the data; and
an error detection generation element configured to generate the protection, wherein the protection comprises cyclic redundancy check (CRC) data based on the first second copy of the data and the timestamp to verify integrity during the validating.

8. The network switch device of claim 7, wherein the one or more voter elements are further configured to validate one or more of the second copies of the data at least partially based on the CRC data.

9. The network switch device of claim 1, wherein the receive port is configured to receive the data from a sending network element, and wherein the send port is configured to forward the data to the next network element.

10. A method of operating a network switch that comprises a receive port and a send port, the method comprising:
receiving data via the receive port;
providing a first copy of the data to two or more parallel paths of the network switch between the receive port and the send port;
at each of the two or more parallel paths, performing a check on the first copy of the data;
applying a size constraint to the two or more parallel paths;
applying a bandwidth constraint to the two or more parallel paths;
crosschecking, at the network switch, second copies of the data received from the two or more parallel paths;
indicating that at least two copies of the second copies match each other and are valid based at least on comparing timestamps of the second copies of the data from the two or more parallel paths and that the second copies satisfy the size constraint and the bandwidth constraint; and
sending, from the network switch, one or more of the at least two copies of the data, via the send port, to a next network element.

11. The method of claim 10, further comprising processing valid data by generating and embedding routing information with the valid data.

12. The method of claim 11, wherein processing the valid data is performed at a single processing section of the network switch.

13. The method of claim 10, further comprising generating a protection for the first second copy of the data by the two or more parallel paths.

14. The method of claim 13, wherein generating the protection comprises generating cyclic redundancy check (CRC) data.

15. The method of claim 13, further comprising:
prior to sending one or more of the at least two copies of the second copies of the data to the next network element:
providing third copies of the data to one or more parallel second paths of the network switch;
at each second path of the one or more parallel second paths, performing multiple checks on a third copy of the data, the multiple checks comprising a check based on the protection; and
crosschecking, at the network switch, fourth copies of the data received from the one or more parallel second paths.

16. A system comprising:
a sending network element;
a next network element; and
network switch device comprising:
a receive port configured to receive data from the sending network element;
two or more parallel paths coupled to the receive port, each of the two or more parallel paths configured to receive a first copy of the data from the receive port, and perform a check on the first copy of the data;
a frame filter configured to apply a size constraint to the two or more parallel paths;
a frame policing element configured to apply a bandwidth constraint to the two or more parallel paths;
one or more voter elements configured to:
receive second copies of the data from the two or more parallel paths;
crosscheck the second copies of the data;
validate one or more of the second copies of the data by the following: comparing timestamps of the second copies of the data from the two or more parallel paths and that the second copies satisfy the size constraint and the bandwidth constraint; and
a send port configured to:
receive at least one copy of the second copies that is determined to be valid; and
send the at least one copy to the next network element responsive to the one or more voter elements.

17. The system of claim 16, wherein each of the two or more parallel paths comprises:
- a timestamp element configured to apply a timestamp to the first copy of the data; and
- an error detection generation element configured to generate a protection, wherein the protection comprises cyclic redundancy check (CRC) data based on the first copy of the data and the timestamp to verify integrity during the validating.

18. The system of claim 16, further comprising a processing section configured to embed routing information with valid data and to store the valid data with the embedded routing information.

19. The system of claim 16, wherein the two or more parallel paths are configured to generate a protection for the first copy of the data.

20. The system of claim 19, further comprising:
- a timestamp element configured to apply a timestamp to the second copy of the data; and
- an error detection generation element configured to generate the protection, wherein the protection comprises cyclic redundancy check (CRC) data based on the second copy of the data and the timestamp to verify integrity during the validating.

* * * * *